(12) United States Patent
Dunmead et al.

(10) Patent No.: US 6,495,115 B1
(45) Date of Patent: Dec. 17, 2002

(54) METHOD TO PRODUCE A TRANSITION METAL CARBIDE FROM A PARTIALLY REDUCED TRANSITION METAL COMPOUND

(75) Inventors: Stephen D. Dunmead, Midland, MI (US); Kevin J. Nilsen, Midland, MI (US); Gabrielle R. Lasher, Muscatine, IA (US); Joseph F. Repman, Midland, MI (US); Hobart A. Barker, Midland, MI (US); Alan W. Weimer, Niwot, CO (US)

(73) Assignee: OMG Americas, Inc., Cleveland, OH (US)

( * ) Notice: Subject to any disclaimer, the term of this patent is extended or adjusted under 35 U.S.C. 154(b) by 718 days.

(21) Appl. No.: 08/703,153

(22) Filed: Aug. 29, 1996

Related U.S. Application Data

(60) Provisional application No. 60/003,631, filed on Sep. 12, 1995.

(51) Int. Cl.$^7$ ............................................. C01B 31/30
(52) U.S. Cl. ...................................... 423/440; 423/439
(58) Field of Search .................... 423/439, 440; 501/93

(56) References Cited

U.S. PATENT DOCUMENTS

| | | | |
|---|---|---|---|
| 1,940,308 A | 12/1933 | Kelley | |
| 3,848,062 A | 11/1974 | Steiger et al. | ............... 423/440 |
| 3,850,614 A | 11/1974 | Bleecker | ........................... 75/5 |
| 3,932,594 A | 1/1976 | Gortsema | .................... 423/440 |
| 4,008,090 A | 2/1977 | Miyake et al. | ................. 106/43 |
| 4,664,899 A | 5/1987 | Kimmel et al. | .............. 423/440 |
| 4,948,573 A | 8/1990 | Nadkarni et al. | ............ 423/291 |
| 4,948,762 A * | 8/1990 | Krumbe et al. | .............. 423/409 |
| 5,166,103 A | 11/1992 | Krstic | ........................... 501/87 |
| 5,372,797 A | 12/1994 | Dunmead et al. | ............ 423/430 |
| 5,380,688 A | 1/1995 | Dunmead et al. | .............. 501/87 |
| 5,389,585 A | 2/1995 | Konig et al. | ................... 501/87 |
| 5,460,759 A * | 10/1995 | Dubots | ......................... 423/439 |
| 5,567,662 A * | 10/1996 | Dunmead et al. | ............ 423/440 |

* cited by examiner

Primary Examiner—Stuart L. Hendrickson
(74) Attorney, Agent, or Firm—Kalow & Springut LLP

(57) ABSTRACT

A transition metal carbide is formed from a precursor mixture comprising at least one of the group consisting of: a transition metal, a transition metal carbide and a transition metal oxide. The precursor mixture may contain the desired transition metal carbide (e.g., WC), but if the desired transition metal carbide is present in the precursor mixture, there is necessarily a significant amount of another compound such as a transition metal oxide, undesired carbide (e.g., $W_2C$) or transition metal. The method involves forming an admixture by mixing the precursor mixture with a sufficient amount of carbon to carburize the precursor mixture to the transition metal carbide and reacting the admixture in an inert or reducing atmosphere at a temperature for a time sufficient to convert the admixture to the transition metal carbide, wherein the admixture is reacted in the presence of a means to enhance transfer of heat into the admixture, an inert or reducing gas flowing through at least a portion of the admixture or combination thereof.

23 Claims, No Drawings

METHOD TO PRODUCE A TRANSITION METAL CARBIDE FROM A PARTIALLY REDUCED TRANSITION METAL COMPOUND

CROSS-REFERENCE TO RELATED APPLICATION

This application claims the benefit of U.S. Provisional Application No. 60/003,631, filed Sep. 12, 1995.

FIELD OF THE INVENTION

The invention is directed to the production of carbides of the transition metals Ti, Zr, Hf, V, Nb, Ta, Cr, Mo and W and solution carbides of said transition metals.

BACKGROUND OF THE INVENTION

There are generally two forms of tungsten carbide; monotungsten carbide (WC) and ditungsten carbide ($W_2C$). It is well-known that WC is useful in the manufacture of commercially worthwhile items such as cutting tools, dies and drilling tools, whereas $W_2C$ generally is not. In fact, $W_2C$ degrades the properties such as strength of WC objects even when present only in small quantities.

In producing said WC items, it is common for a tungsten carbide powder to be combined with a metal such as cobalt and subsequently densified into a WC/Co cemented carbide by heating. The heating may take place at a pressure ranging from vacuum to pressures greater than atmospheric pressure.

In a cemented carbide part, the tungsten carbide, grain size and grain size distribution and grain chemistry greatly influence the final part properties. As already stated above, $W_2C$ should be avoided when making cemented tungsten carbide parts. Generally, smaller grain size in a cemented part results in improved strength. In addition smaller grain sizes often result in higher hardness at a given cobalt addition. Non-uniformity of grain size in a cemented tungsten carbide part adversely affects the strength of and the surface condition of the part after grinding. The non-uniformity of grain size in the cemented WC part is primarily due to exaggerated grain growth during the densification of the part. The grain growth can be controlled by addition of grain growth inhibitors such as VC, $Cr_3C_2$ or TaC or starting with a WC powder having as narrow (i.e., uniform) as possible particle size distribution.

WC powder which has an average particle size less than 0.2 to 0.3 micrometer can cause exaggerated grain growth due to the increased reactivity associated with the fine particle size. It has also been reported that standard grain growth inhibitors, as described above, are not effective when sintering a cemented WC part using said fine WC powder. The critical parameter to sinter said fine WC powders was reported to be the WC powder grain size distribution (Suzuki et al, *J. Jap. Soc. Powder and Powder Met.,* Vol. 19, p. 106–112, 1972). Thus, it is desirable to be able to increase the particle size or control the particle size distribution of very fine WC powder (less than 0.2 to 0.3 micrometer) to reduce the possibility of grain growth during the densification of a cemented WC part.

Typically, monotungsten carbide is formed by the carburization of tungsten metal. The basic process steps commonly are:

(a) calcining of ammonium paratungstate or tungstic acid to one of the stable forms of tungsten oxide, such as $WO_3$, $WO_{2.83}$, $WO_{2.65}$ and $WO_2$, (b) reducing the tungsten oxide to tungsten metal powder, (c) mixing the tungsten metal powder with a powdered form of carbon, (d) carburizing the tungsten and carbon mixture at a temperature in excess of 1100° C. in a reducing (hydrogen containing) atmosphere.

The resultant WC particle size is controlled by the size of the W metal powder formed in the above step (b). Tungsten metal particle size, as described by U.S. Pat. No. 3,850,614, is controlled mainly by:

(1) depth of powder bed during reduction,
(2) flow rate of hydrogen,
(3) dew point of the hydrogen gas and
(4) reduction temperature.

Smaller particle size tungsten powder is produced by increasing gas flow, decreasing bed depth, reducing the dew point of the hydrogen gas and decreasing reduction temperature. By reducing the bed depth and reducing the temperature, the amount of tungsten powder that can be carburized to WC in a given period of time is decreased. The mechanism of growth has been attributed to a volatile WOH species directly associated with the water concentration in the gaseous environment (U.S. Pat. No. 3,850,614). Processes requiring the carburization of tungsten metal to form monotungsten carbide are typically limited to producing WC powder having a particle size of about 0.8 micron or larger because of the difficulty in producing W metal much smaller than this size due to, for example, the pyrophoric nature of such a fine tungsten metal powder. Because of the high hardness of WC, it is also difficult to grind WC to this small particle size. Even if WC were easily ground to the fine particle size, the grinding process inherently produces a wide particle size distribution compared to a controlled synthesis process.

Other methods of producing monotungsten carbide include the following methods. Steiger (U.S. Pat. No. 3,848,062) describes reacting a volatile tungsten species such as $WCl_5$, $WCl_4$, $WCl_2$, $WO_2Cl_2$, $WOCl_4$, $WOF_4$ and $W(CO)_6$ with a vaporous carbon source such as a volatile hydrocarbon or halogenated hydrocarbon. The vaporous carbon source is present in a quantity at least equal to WC stoichiometry during the above vapor phase reaction. The product from this reaction, a mixture of WC, $W_2C$ and carbon, is then calcined at a temperature of about 1000° C. for about 1 to 2 hours resulting in monotungsten carbide substantially free of ditungsten carbide.

Miyake (U.S. Pat. No. 4,008,090) describes a process having a first step of reacting a tungsten oxide with a carbon powder at a temperature greater than 1000° C., thereby removing the oxygen and a second step of reacting the product of the first step at a temperature higher than the first step in hydrogen to produce monotungsten carbide. Miyake specifies that the temperature must be greater than 1000° C. in the first step to remove the oxygen. The removal of oxygen is necessary to avoid the reaction of hydrogen with oxygen forming water vapor which consequently reacts with carbon forming a volatile carbon-oxygen species, thus effecting the carbon content of the second step product (i.e., desired monotungsten carbide).

Kimmel (U.S. Pat. No. 4,664,899) describes a method to form monotungsten carbide comprising mixing tungsten oxide or ammonium paratungstate with carbon powder to form a resulting mixture, reducing said mixture in a non-reducing atmosphere for a sufficient time at a suitable temperature to produce resulting reduced mixture comprising tungsten, ditungsten carbide and monotungsten carbide, said reducing being carried out in the presence of sufficient carbon to produce a carbon content of less than 6.13 percent by weight in said resulting reduced mixture, determining the carbon content of said resulting reduced mixture, adding sufficient carbon to said resulting reduced mixture to increase the carbon content to at least the stoichiometric amount needed to form monotungsten carbide and carburizing said adjusted reduced mixture to form monotungsten carbide. Kimmel further describes that the product of the reducing of the tungsten oxide is a mixture of W, $W_2C$, WC and free carbon and that all of the oxide is reduced.

All of the above described processes to produce monotungsten carbide require the reduction of a tungsten oxide or tungsten compound (e.g., $WCl_4$) to either tungsten or a mixture of tungsten metal, carbides of tungsten and free carbon. The tungsten or mixture is substantially free of oxygen (i.e., tungsten oxide) before carburizing to form monotungsten carbide. The oxygen is essentially completely removed to avoid the volatile loss of carbon by oxidation or hydrolysis during the carburization of tungsten metal or said mixture. The removal of carbon during the carburization causes non-uniform carbon contents of the resultant carbide product (i.e., $W_2C$ in the product). Non-uniform carbon contents are particularly a problem in industrial processes because of the larger volume of carbide that must be processed.

In an industrial process it would be desirable to provide a method to produce a transition metal carbide which is relatively insensitive to the oxygen concentration of the precursor mixture used to make said carbide. In addition, it would be desirable to have a process in which said carbide particle size can be significantly controlled by the process and not solely dependent on the particle size of the precursor mixture (i.e., start with small particle size and grow to a desired size). In particular, it would be desirable to provide said method for producing monotungsten carbide.

SUMMARY OF THE INVENTION

The object of this invention is a method to produce a transition metal carbide from a precursor mixture in which the precursor mixture is comprised of a product of at least a partial reduction or partial carburization of a transition metal compound, the method being comprised of:

a) forming an admixture by mixing the precursor mixture with a sufficient amount of carbon to carburize the precursor mixture to the transition metal carbide and b) reacting the admixture in an inert or reducing atmosphere at a temperature for a time sufficient to convert the admixture to the transition metal carbide wherein the admixture is reacted in the presence of
(i) a means to enhance transfer of heat into the admixture,
(ii) an inert or reducing gas flowing through at least a portion of the admixture, or
(iii) combination thereof.

The method of this invention, in particular, allows monotungsten carbide to be uniformly formed even when the precursor mixture has a significant amount of tungsten oxide present. It is believed that the present invention overcomes the chemical non-uniformity of product caused by hydrolysis or oxidation of carbon which occurs during carburization of the precursor mixture by reducing the inhomogeneity of the reactions taking place in the admixture during said carburization.

For monotungsten carbide, it has now been discovered that the particle size of the monotungsten formed is inversely proportional to the gas flow rate through the hereinabove described admixture. The gas flow rate effect is unexpected and surprising since U.S. Pat. No. 3,850,614 describes tungsten particle size and, hence, monotungsten carbide particle size being directly proportional to gas flow passing over, not through, a precursor mixture to form a tungsten powder. In addition, the particle size of said monotungsten carbide can also be controlled by temperature.

DETAILED DESCRIPTION OF THE INVENTION

Transition Metal Carbide Product

The method of this invention is directed at forming transition metal carbides, solid solution transition metal carbides or a combination thereof. The transition metal carbides that are formed can be any carbide containing a transition metal selected from the group consisting of: Ti, Zr, Hf, V, Nb, Ta, Cr, Mo, W and a solution carbide of said transition metals. The transition metal carbide is preferably monotungsten carbide (WC), monotitanium carbide (TiC), monotantalum carbide (TaC), monovanadium carbide (VC), monohafnium carbide (HfC), monozirconium carbide (ZrC), mononiobium carbide (NbC), dimolybdenum carbide ($Mo_2C$) or trichromium dicarbide ($Cr_3C_2$). Preferably the method according to this invention produces monotungsten carbide or monotungsten carbide in combination with at least one of the above transition metal carbides or solid solution metal carbides. Most preferably the invention forms a monotungsten carbide.

When producing monotungsten carbide by the method of this invention, the monotungsten carbide formed, as determined by X-ray diffraction, preferably has no detectable tungsten metal, no detectable tungsten oxide and less than about 5 percent by weight ditungsten carbide, more preferably less than about 1 percent by weight ditungsten carbide and most preferably no detectable ditungsten carbide. The quantitative analysis is performed by X-ray diffraction described hereinafter.

The free carbon concentration in the produced monotungsten carbide is desirably less than about 0.5 weight percent. Preferably the free carbon in the produced WC is less than about 0.2, more preferably less than about 0.1 and most preferably less than about 0.05 weight percent. The free carbon is determined by an acid digestion process described hereinafter.

Method to Form said Transition Metal Carbide
First Step (a)

The first step of the method according to this invention is mixing the precursor mixture with a sufficient amount of carbon to form an admixture having sufficient carbon to carburize the precursor mixture to the transition metal carbide.

Carbon

The carbon can be crystalline, amorphous, organic material or combination thereof. Suitable crystalline or amorphous carbon includes graphite or carbon black such as acetylene carbon black which is commercially available under the trade name "SHAWANIGAN." Suitable examples of organic material include organic polymers such as phenol-formaldehyde resins, epoxies, cross-linked polystyrenes and cellulosic polymers, carbohydrates such as sugars and starches and hydrocarbons.

Precursor Mixture

The precursor mixture is comprised of the product of at least a partial reduction or carburization of a transition metal compound such as a transition metal oxide described herein. The precursor mixture is comprised of at least one transition metal compound selected from the group consisting of: a transition metal, a transition metal carbide and a transition metal oxide. In addition, free carbon may be present in the precursor mixture. The transition metal can be a transition metal selected from the group consisting of: Ti, Zr, Hf, V, Nb, Ta, Cr, Mo, W and solid solutions thereof. The transition metal carbide can be one or more carbide of Ti, Zr, Hf, V, Nb, Ta, Cr, Mo or W, or a carbide compound containing at least two of said transition metals. The transition metal oxide can be one or more oxide containing Ti, Zr, Hf, V, Nb, Ta, Cr, Mo or W, or an oxide compound containing at least two of said transition metals. The carbon which may be in the precursor mixture is either a residual reactant or is formed during the formation of the precursor mixture. The free carbon can be crystalline or amorphous. The free carbon can originate from such carbon sources such as carbon black, graphite or organic material, each described hereinabove.

The product of at least a partial reduction or carburization of a transition metal compound may result in a precursor mixture having the desired transition metal carbide (e.g., WC). However, if the desired transition metal carbide is present in the precursor mixture, there must be, according to this invention, a significant amount of another transition metal compound such as a transition metal oxide, undesired transition metal carbide (e.g., $W_2C$), transition metal or combination thereof. Herein, greater than about 5 percent by weight of the precursor mixture is a significant amount of another transition metal compound.

When the transition metal carbide to be produced is monotungsten carbide, the precursor mixture may be comprised of:

(1) tungsten;
(2) tungsten, ditungsten carbide and monotungsten carbide or
(3) tungsten, ditungsten carbide, monotungsten carbide, carbon and at least one form of tungsten oxide.

The quantity of oxygen in the precursor for forming monotungsten carbide (WC) may be as great as about 5 percent by weight Preferably, the oxygen is less than about 3, more preferably less than about 2 and most preferably less than about 1 percent by weight as determined by combustion analysis described hereinafter. Practically, the oxygen concentration is never 0 percent by weight because the formation of an oxide of tungsten is thermodynamically favored over the carbide at room temperature in air. The oxygen level may be as low as practically feasible but this is not necessary for the method of this invention. For example, in performing the method of this invention, the precursor oxygen can be greater than about 0.5 percent by weight. The oxygen is taken to be in the form of an oxide of tungsten and conveniently assumed to be $WO_3$ for calculation of stoichiometry described hereinbelow.

Generally, the precursor mixture is formed by at least partial reduction of a transition metal oxide powder by either carburization or reduction by hydrogen. Methods that are suitable to form the precursor mixture described hereinabove include methods that are described by U.S. Pat. Nos.: 4,008,090; 4,644,899; 3,850,614 and 3,848,060, each being incorporated herein by reference. Preferably the precursor mixture is prepared by the rapid carbothermal reduction methods described below and by U.S. Pat. No. 5,380,688, incorporated herein by reference.

The precursor mixture is preferably prepared by mixing a solid particulate carbon source (e.g., carbon black), as described hereinabove, with a transition metal oxide. The quantity of carbon added to the oxide is an amount sufficient to carburize a majority of the oxide forming a transition metal carbide. Preferably the quantity of carbon is added in a quantity less than or equal to stoichiometry of the desired transition metal carbide. For example, in producing a precursor mixture to make WC, the amount of carbon present should be a stoichiometric or less than stoichiometric amount. The stoichiometric amount corresponds to 4 moles of carbon per mole of $WO_3$ (i.e., $WO_3+4C=WC+3CO$).

The transition metal oxide can be a single transition metal oxide (single oxide) or an oxide containing more than one transition metal, referred to herein as a transition metal oxide alloy. The oxides are oxides of the transition metals described previously. Preferably the transition metal oxide is a single oxide or combination of single oxides. When a combination of single oxides are used in the rapid carbothermal reduction method, a solid solution carbide may be formed as described by U.S. Pat. No. 5,380,688. Preferably the transition metal oxides have a purity greater than about 99 percent and a uniform particle size wherein all of the particles and agglomerates pass through a 325 mesh screen (i.e., the largest oxide particle or agglomerate is less than about 45 microns in diameter). Suitable examples include single oxides such as tungsten trioxide ($WO_3$) available under the trade name "TO-3" from GTE Products corp., titanium dioxide ($TiO_2$) available under the trade name "TITANOX" from Veliscol Chemical Corp., and ditantalum pentoxide ($Ta_2O_5$) available from Aldrich Chemical Company.

The transition metal oxide and carbon can be mixed in any apparatus suitable to mix powders. Examples of mixing apparatus include, but are not limited to, a sigma mixer, muller mixer, V-blender and cone blender. If further particle size reduction of the transition metal oxide or carbon is desired, said oxide or carbon can be milled before mixing or mixed and milled simultaneously in any apparatus capable of milling (reducing powder particle size) such as a ball mill, jet mill, vibratory mill or an agitated mill such as an attritor. If milling is performed requiring milling media, for example in a ball mill, the milling media is preferably cemented tungsten carbide-cobalt milling media. The carbon and transition metal oxide(s), transition metal oxide alloy(s) or combination thereof, after being mixed, will be referred to hereinafter as the oxide-carbon reactive mixture.

The oxide-carbon reactive mixture is advantageously reacted by rapid carbothermal reduction in a drop or an entrainment method. The drop method involves heating a graphite crucible in the hot zone of an induction furnace to the desired reaction temperature. The crucible is heated in a non-oxidizing atmosphere such as flowing argon. The crucible is maintained at the reaction temperature for a time sufficient (about 30 minutes) to equilibrate the crucible and furnace at that temperature. Aliquots of the reactive mixture are dropped in said graphite crucible in the induction furnace producing heating rates in the range of 100 to 10,000 K per second. The extent of the reaction is monitored by measuring the reactant by-product CO level in the crucible as function of time. When the CO level decreases back to a CO level equivalent to about the CO concentration before beginning the reaction, the reaction is stopped by cooling the crucible as rapidly as possible back to room temperature to minimize particle agglomeration and grain growth of the reacted oxide-carbon reactive mixture.

The entrainment method involves the use of a vertical graphite tube reaction furnace of the type described by U.S. Pat. No. 5,110,565, incorporated herein by reference. The oxide-carbon reactive mixture is placed into a feed hopper, which allows flowing non-oxidizing gas, such as argon, to entrain the powdered mixture and deliver it to the furnace reaction chamber as a dust cloud. The powder or particulate mixture is heated in the reaction chamber at rates of between about 10,000 to 100,000,000 K per second, while the average residence time of powder in the furnace is on the order of seconds. As for exiting the hot zone of the reaction chamber, the flowing gas carries the powder into a water cooled stainless steel jacket which rapidly cools reacted powder below 283 K. The preferred method to make the precursor mixture of this invention from the oxide-carbon reactive mixture is by the entrainment method, because the entrainment method is capable of more uniform reaction conditions and, thus, greater capability in forming uniform small particle size precursor mixture powder.

The oxide-carbon reactive mixture is reacted (i.e., carburizing of the oxide) by heating from room temperature up to the reaction temperature at a rate preferably at least 100 to 10,000 K per second and optimally on the order of 10,000 to 100,000,000 K per second. The reaction temperature must be high enough such that the reaction is thermodynamically favorable. One way of expressing this is to say that the Gibbs free energy change for the reaction must be negative. In other words, the free energy of formation of reaction products must be less than the free energy of formation of components of the reactant mixture. It must also be less than the melting point of any intended reaction product(s). For tungsten carbide, a reaction temperature of at least 1673 K is considered beneficial, while temperatures of 1823 K to 2673 K are preferred. Approximate temperatures at which free energy of formation of reaction products is less than free energy of formation of components of the reactant mixture needed to form the reaction products are as follows: tungsten carbide (WC) 950 K; titanium carbide (TiC) 1555 K; tantalum carbide (TaC) 1381 K; vanadium carbide (VC) 932 K; hafnium carbide (HfC) 1934 K; niobium carbide (NbC) 1228 K; zirconium carbide (ZrC) 1930 K; dimolybdenum carbide ($Mo_2C$) 742 K and trichromium dicarbide ($Cr_3C_2$) 1383 K.

The residence time of the oxide-carbon reactive mixture at the reaction temperature depends in part upon the heating rate and reaction temperature, but must be high enough to reduce at least a major portion of the metallic oxide from the reactant mixture. The residence time is preferably in the range of about 0.1 second to 1/2 hour, depending upon the heating method, heating rate, reaction temperature and the ultimate particle size desired. In the drop method, typical preferred residence times are from about 5 minutes to 2 hours for a reaction temperature of 1773 K with a heating rate of about 100 to 10,000 K per second. In the entrainment method, a residence time of from about 0.2 to 10 seconds for a reaction temperature of 1823 K or above with a heating rate of about 10,000 to 100,000,000 K per second is preferred. At the higher heating rate, residence times substantially greater than 10 seconds may undesirably produce sintered aggregates rather than particulate product. Whatever combination of reaction temperature, residence time and heating rate is selected, however, it should be adequate to convert the reactive particulate mixture of carbon and metal oxide into a product composed mainly of metal carbide. In other words, the product, for example, for making WC would be the precursor mixture previously described.

Forming the Admixture

The admixture is formed by mixing the previously described carbon and precursor mixture together. Preferably the carbon is a solid carbon such as carbon black. The carbon and precursor are mixed or milled together by the same techniques and methods previously described for mixing the oxide and carbon to form the oxide-carbon reactive mixture. Preferably the carbon and precursor mixture are mixed in a ball mill having cemented tungsten carbide cobalt media.

The quantity of carbon which is added to the precursor mixture is typically determined empirically with respect to the transition metal carbide desired. For example, when producing WC from an admixture of the precursor mixture and carbon in a 5 percent hydrogen-95 percent argon gas mixture, Applicants have found that an amount of carbon comprising the sum of about 0.67 stoichiometric with respect to the oxygen (i.e., $WO_3+(0.67)4C=WC+3CO$) in the precursor mixture, and stoichiometric with respect to $W_2C$ and free metal (W) in the precursor mixture typically converts the precursor mixture to a monotungsten carbide having low free carbon and low total oxygen. Typically, the amount of carbon to be added to the tungsten carbide precursor made by the entrainment method usually amounts to about 1 to about 5 weight percent based on the precursor mixture weight, more typically the amount is in the range of about 2 to about 3 weight percent. The amount of carbon which is necessary to convert the admixture to a desired transition metal carbide may change depending on, for example, the reactor, atmosphere and precursor mixture. For any conditions according to this invention, the quantity of carbon may be determined by routine experimentation by those skilled in the art.

Second Step (b)

The second step of the method according to this invention is reacting the admixture in an inert or reducing atmosphere at a temperature for a time sufficient to convert the admixture to the transition metal carbide wherein the admixture is reacted in the presence of (i) a means to enhance transfer of heat into the admixture, (ii) an inert or reducing gas flowing through at least a portion of the admixture or (iii) combination there of.

The admixture is reacted at a temperature e and time sufficient to convert substantially all of the precursor mixture to the desired transition metal carbide. For example, when forming monotungsten carbide (WC) the admixture can be heated to a temperature of between about 900° C. to 1800° C. for any time sufficient to convert the admixture to the WC described hereinbefore. Preferably the temperature of the admixture reaction is between about 1000 to 1600° C.. The temperature of the reaction has been shown to be directly proportional to the WC product particle size. The time of the reaction is desirably as short a period of time as possible to convert the admixture to WC. Preferably the reaction time is at least about 5, more preferably at least about 15, and most preferably at least about 30 minutes to preferably at most about 10, more preferably at most about 5 and most preferably at most about 2 hours.

The atmosphere can be any reducing or inert atmosphere. Gases which are suitable to create the atmosphere include hydrogen, a hydrogen-argon mixture or argon. Preferably the gas is a 2–6 percent hydrogen in argon gas mixture because these mixtures provide a reducing environment while the amount of hydrogen in the mixture is below the explosive limit. It is also preferred that initially the atmosphere be inert, for example argon, until substantially all of the oxygen present in the admixture is removed (i.e., little or no CO is being generated by the re action) and then subsequently the gaseous atmosphere is changed to a reducing atmosphere such as 5 percent hydrogen in argon. The use of an inert gas followed by a reducing gas may a void or reduce the formation of water vapor which can subsequently react with carbon forming CO (i.e., $H_2+O=H_2O$ and subsequently $H_2O+C=CO+H_2$).

During the reacting of the admixture, the atmosphere is preferably created by a flowing gas. The gas is desirably flowing to allow the removal of unwanted gaseous species such as water vapor. Excess water vapor may react with carbon to form CO gas, thus changing the carbon concentration of the transition metal carbide formed. The quantity of flowing gas per weight of admixture can be any flow sufficient to react the admixture to form the desired transition metal carbide. Preferably the gas flow is about 5 to about 500 standard liters/min-Kg and more preferably from about 25 to about 250 standard liters/min-Kg.

The admixture can be reacted in a batch or continuous apparatus. Suitable apparatus to react the admixture include, for example, a tube furnace, pusher furnace, belt furnace, rotary furnace, elevator furnace, fluid bed reactor and rotary crucible furnace. It is desirable for the apparatus to be constructed of materials which do not contaminate the admixture during the reaction. Preferably the furnace or reactor is constructed of carbon materials in at least the hot sections of the furnace or reactor. The carbon material should have a purity as described for a carbon object in the following paragraph.

When reacting the admixture, the admixture is reacted in the presence of a means to enhance transfer of heat into the admixture, an inert or reducing gas flowing at least partially through the admixture or combination thereof. The means to enhance transfer of heat into the admixture is any object which conducts heat at a significantly higher rate than the bulk admixture, such as a dense carbon or ceramic object. The object is significantly larger than the admixture particle size wherein the object is separable from the admixture by simple mechanical means such as picking it up by hand. A dense carbon object or objects include graphite or carbon/carbon composite object(s). Preferably the object or objects are carbon objects. The carbon object(s) should be of a purity which does not significantly contaminate the admixture. Commercial graphite commonly has significant silicon contamination. Therefore, a graphite or carbon object which is used to perform the method of this invention preferably has a silicon and total metal contamination of less than about 25 parts per million (ppm) and more preferably less than about 10 ppm.

The objects can be of any geometry such as a plate, tube, rod or an array of plates, tubes or rods. The object is preferably placed in the admixture such that at least a portion of the object is not within the admixture. For example, the admixture is placed in a circular, square or rectangular graphite boat having a graphite rod or plate in the center of the boat wherein the rod or plate is in contact with the bottom of the boat (e.g., the longitudinal axis of the rod extends from the bottom of the boat to the top of the boat). The top of the boat being the open end. It is also preferred that the object or objects extend beyond the top of the admixture in the boat. The object can be contacted with the boat such that the object is an integral part of the boat. For example, the object can be screwed, cemented, or slotted into the bottom of the boat. An example of a suitable cement is a phenol-formaldehyde resin which decomposes to a carbonaceous material upon heating to a high enough temperature in a non-oxidizing atmosphere. In addition, the boat can be machined such that the object is a contiguous part of the boat. The admixture in the boat can be covered or uncovered and subsequently reacted, as described herein, in a batch furnace or continuous furnace such as a pusher furnace. Preferably the furnace is a continuous furnace and more preferably a pusher furnace.

Another example of forming a transition metal carbide with said object or objects is the reaction of the admixture, as described herein, in a rotary furnace. In this example, rods are contacted with the inner diameter of the rotary furnace wherein the longitudinal axis of the rods extend radially in towards the center of the rotary furnace. Desirably the rotary furnace has a rotary section (tube) which is graphite or carbon/carbon composite and said rods are periodically screwed into the inner diameter and along the longitudinal axis of said tube. The rods may also beneficially mix and deagglomerate the admixture in the rotary furnace. When the admixture is reacted in the presence of a means to enhance transfer of heat into the admixture (e.g., carbon objects), a more chemically uniform transition metal carbide, particularly WC, is formed compared to when no said means to enhance heat transfer into the admixture is present. More chemically uniform leads to less undesirable transition metal carbide (e.g., $W_2C$), less oxygen, less carbon or combination thereof present in the transition metal carbide product.

When the admixture is reacted in the presence of an inert or reducing gas at least partially flowing through the admixture, similar apparatus described above can be used. For example, the circular, rectangular or square graphite boat can have an outlet at the bottom of the boat in which gas can pass through but the admixture cannot. Suitable outlets can involve at least one hole through the bottom of the boat in which the hole(s) have a porous membrane capable of passing the inert or reducing gas but not the admixture. Suitable membranes include graphite felt, carbon fiber mesh or a porous graphite. An example would be a boat having a first bottom having one hole in the center of said bottom traversing from the outside of the boat to the inside of the boat. The first bottom is an integral part of the boat. Said boat has a second bottom fully covering and positioned on top of the first bottom within the boat wherein a space exists between the first and second bottom. The second bottom has multiple holes through it which are parallel to the hole in the first bottom. The second bottom also has graphite felt placed thereon.

When reacting the admixture, as described herein, in the above described boat, the admixture is put in the boat on the graphite felt and placed, for example, in a batch furnace which has means to introduce or exhaust gas through the hole in the first bottom of the boat. Means to exhaust or introduce gas is, for example, a graphite tube traversing the furnace bottom which then engages (e.g., by screw threads) the boat bottom on the inner diameter of the hole in the bottom of the boat. The boat just described can, of course, have an object previously described to enhance transfer of heat into the admixture.

Another example of reacting the admixture, as described herein, in the presence of an inert or reducing gas flowing through at least a portion of the admixture, can be to insert a graphite tube described above through the furnace top wherein the end of the tube is position some depth into admixture contained in a boat having a solid bottom. The gas is then flowed into the admixture, the gas passing through some portion of the admixture and subsequently exhausting out of the furnace elsewhere. The end of the tube placed in the admixture may be configured by any number of configurations to best disperse the gas into the admixture. For example, the end of the tube in the admixture can have a plugged end wherein the gas exits the tube through passageways traversing from the outer diameter to the inner diameter at the end of the tube. In this example, the tube may also function as the thermal enhancement means. Inert or reducing gas flow through at least a portion of the admixture unexpectedly results in a transition metal carbide (particularly WC) particle size which is inversely proportional to the flow rate of the gas. In addition, an increase in flow rate results in less or no $W_2C$ formation at otherwise identical reaction conditions.

The transition metal carbide powder(s) and, in particular, WC formed according to the method of this invention are useful as items such as abrasives and as a constituent in forming cemented carbide wear resistant parts such as cutting tools and blast nozzles of all types and dies.

Test Methods

The following are typical methods for analyzing a transition metal carbide described herein.

Carbon

The carbon concentration in a transition metal carbide of this invention is determined using a "LECO" IR-212 carbon analyzer™. A "LECO" supplied tungsten carbide standard having 6.16 percent by weight carbon is used to calibrate the analyzer. The analyzer is calibrated using at least 4 standard analyses as described by the manufacturer (LECO). Each sample and standard is analyzed with a scoop of LECOCEL II™ and iron chips. The scoop is provided by the manufacturer (LECO). At least four carbide samples are analyzed.

Oxygen

The oxygen concentration in a transition metal carbide of this invention is determined using a "LECO" TC-136 oxygen determinator™. A 0.0246 percent by weight oxygen standard is used. The oxygen determinator is calibrated using at least 4 standard analyses as described by the manufacturer of the determinator. A carbide sample is analyzed by placing about 0.2 gram of sample in a manufacturer supplied tin capsule and nickel basket. At least four carbide samples are analyzed.

Surface Area

Surface area of the transition metal carbide is determined by nitrogen gas adsorption as described by the BET method (Brunauer, Emmett and Teller). The analysis is performed on a Quantachrome Autosorb 1 analyzer.

Free Carbon

The free carbon in a transition metal carbide of this invention is determined by acid digesting an amount of transition metal carbide (e.g., WC) in hydrofluoric and nitric acid, filtering the carbon residue onto a silver filter and determining the carbon on the silver filter by the method described above for determining carbon concentration.

Phase Determination

The phases and quantity of differing transition metal carbide phases is determined by X-ray diffraction. The quantity of phases is determined by a method involving the ratio of peak heights or integrated peak areas between peaks caused by differing phases. For example, the quantity of $W_2C$ is calculated from the ratio between 2 times the peak height of the $W_2C$ peak at a "d" spacing of 2.276 Angstroms divided by the heights of the WC peaks at a "d" spacing of 2.518 and 1.884 Angstroms.

Below are specific examples within the scope of the invention and comparative examples. The specific examples are for illustrative purposes only and in no way limit the invention described herein.

EXAMPLES

Example 1

A precursor mixture, prepared by the entrainment method described herein and in U.S. Pat. No. 5,380,688, and SHAWNIGAN™ acetylene black (carbon black) are reacted forming essentially monotungsten carbide. The precursor mixture is comprised of WC, $W_2C$, carbon, tungsten oxide and tungsten metal wherein the mixture has an oxygen concentration of about 1.75 percent by weight, carbon concentration of about 4.88 percent by weight and a surface area of 5.8 $m^2/g$.

The precursor mixture-carbon admixture is made by mixing 2.12 parts by weight of the carbon black with 97.88 parts by weight of the above precursor mixture in a urethane lined ball mill partially filled by cemented WC-Co milling media. The admixture has a bulk density of about 1.2 g/cc.

The above admixture is placed in a 23 cm long by about 23 cm wide by about 10 cm deep graphite boat which has been partitioned into 6 cavities about 23 cm long by about 4 cm wide by about 10 cm deep using 5 graphite plates (means to enhance transfer of heat into the admixture). The plates are about 23 cm long by about 10 cm deep by about 0.64 cm thick. The admixture is then placed in each of the 6 cavities to a depth slightly less than the depth of the boat and covered by a graphite plate.

The admixture of Example 1 in the above boat is reacted in a graphite furnace. The furnace is heated to 1525° C. and maintained at that temperature for 3 hours and subsequently cooled to room temperature. The reaction is carried out in a flowing 5 percent hydrogen-95 percent argon gas mixture.

Samples of the Example 1 reacted admixture are taken from center of the boat (a center cavity) from both the top and about 5 cm below the top of the reacted admixture. The sample taken at the top of reacted admixture is referred to as a "top" sample herein. A sample taken about 5 cm below the top of the admixture top is referred to as a middle sample herein. After mixing the remaining reacted admixture in a ball mill described above, another sample is taken. The sample taken of a mixed admixture is referred to as a mixed sample herein. The properties of the monotungsten formed by the method of this example is shown in Table 1.

Example 2

The monotungsten carbide of Example 2 is prepared by the method described by Example 1, except that the reaction is carried out at 1375° C. for 3.5 hours. The Example 2 admixture is simultaneously reacted in the same furnace as the admixture of Comparative Example 2 described below. The properties of the monotungsten carbide formed by the method of this example are shown in Table 1.

Example 3

The monotungsten carbide of Example3 is prepared by the same method described by Example 1, except that the reaction is carried out at 1445° C. for 4 hours. The admixture of Example3 is simultaneously reacted in the same furnace as Comparative Example 3 described below. The properties of the monotungsten carbide formed by the method of this example are shown in Table 1.

Comparative Example 1

The monotungsten carbide of Comparative Example 1 is prepared by the method described by Example 1, except that the admixture of Comparative Example 1 is placed in a graphite boat which is about 23 cm long by about 23 cm wide by about 10 cm deep inside the boat. The boat in Comparative Example 1 is identical to the boat in Example 1 except that the boat in Comparative Example 1 has not been partitioned by plates (i.e., no means to enhance transfer of heat into the admixture). The depth of the admixture in Comparative Example 1 is slightly less than the depth of the boat and is not covered by a graphite plate. The admixture of Comparative Example 1 is simultaneously reacted in the same furnace as Example 1.

Comparative Example 2

The monotungsten carbide of Comparative Example 2 is prepared by the same method described by Comparative Example 1 except that the admixture of Comparative Example 2 is simultaneously reacted in the same furnace as the admixture of Example 2. The properties of the monotungsten formed by the method of this Comparative Example is shown in Table 1.

Comparative Example 3

The monotungsten carbide of Comparative Example 3 is prepared by the same method described by Comparative Example 1 except that the admixture of Comparative Example3 is simultaneously reacted in the same furnace as the admixture of Example 3. The properties of the monotungsten formed by the method of this Comparative Example is shown in Table 1.

TABLE 1

THE EFFECT OF THERMAL TRANSFER MEANS ON MONOTUNGSTEN CARBIDE POWDER PROPERTIES

| Example No. | Reaction Temperature (° C.) | Reaction Time (Hours) | Mixed Sample Carbon (wt. %) | Middle Sample Carbon (wt. %) | Top Sample Carbon (wt. %) | Carbon Gradient (Middle "C" - Top "C") | Mixed Sample Surface Area (m$^2$/g) | Mixed Sample Free Carbon (wt. %) | Mixed Sample Bound Carbon (wt. %) |
|---|---|---|---|---|---|---|---|---|---|
| Example 1 | 1525 | 3 | 6.12 | 6.17 | 5.70 | 0.47 | 0.95 | 0.04 | 6.13 |
| Example 2 | 1375 | 3.5 | 6.15 | 5.89 | 6.45 | 0.56 | 1.53 | 0.08 | 6.07 |
| Example 3 | 1445 | 4 | 6.16 | 6.30 | 5.61 | 0.71 | 1.30 | 0.09 | 6.07 |
| Comp. Example 1 | 1525 | 3 | 6.11 | 6.43 | 4.78 | 1.65 | 1.12 | 0.19 | 5.92 |
| Comp. Example 2 | 1375 | 3.5 | 6.18 | 6.51 | 5.05 | 1.46 | 1.73 | 0.21 | 5.97 |
| Comp. Example 3 | 1445 | 4 | 6.19 | 6.63 | 4.08 | 2.54 | 1.54 | 0.23 | 5.97 |

The carbon contents of reacted admixture samples taken at differing places within the boats of Examples 1–3 and comparative Examples 1–3 are shown in Table 1. The results in Table 1 show that the carbon concentration of Examples 1–3 reacted admixtures are more uniform throughout the mixture than the carbon concentration of the Comparative Examples 1–3 reacted admixtures. For example, the reacted admixture (monotungsten carbide) of Examples 1–3 have a carbon gradient that is approximately one third the carbon gradient compared to the corresponding Comparative example (i.e., Example 1 compared to Comparative Example 1). In addition, the amount of free carbon in the monotungsten carbide of Examples 1 to 3 is about one third the amount of free carbon present in the monotungsten carbide of Comparative Examples 1 to 3, respectively. The data in Table 1 show that the addition of said plates to a boat when reacting an admixture (Examples 1–3) forms a more uniform monotungsten carbide.

In addition, the data in Table 1 show that the surface area of the monotungsten carbide formed is inversely proportional to the reaction temperature. For example, the monotungsten carbide of Example 2 (reaction temperature=1375° C.) has a greater surface area than Example 1 (reaction temperature=1525° C.). In other words, the particle size of the reacted admixture is proportional to the reaction temperature, further described hereinafter.

Example 4

A precursor mixture, prepared by the entrainment method described herein and in U.S. Pat. No. 5,380,688, and SHAWNIGAN™ acetylene black (carbon black) are reacted forming essentially monotungsten carbide. The precursor mixture is comprised of WC, W$_2$C, carbon, tungsten oxide and tungsten metal wherein the precursor mixture has an oxygen concentration of about 1.46 percent by weight, carbon concentration of about 3.80 percent by weight and surface area of about 4.1 m$^2$/g. The precursor also is contaminated by about 1000 ppm silicon.

The precursor mixture–carbon admixture is made by mixing about 2.8 parts by weight of the carbon black with about 97.2 parts by weight of the above precursor mixture in a urethane lined ball mill partially filled by cemented WC-Co milling media. After milling, the admixture has a bulk density of about 1.2 g/cc.

A portion of the above admixture is placed in a short graphite container. The container is comprised of a short tube which is capped on each end by a graphite cap. Each cap is removable and and has a through hole concentric with the inner diameter of the container. The through hole diameter of the caps is less than the inner diameter of the container. The powder is placed in the container by uncapping one end of the container and inserting a graphite disk having a plurality of holes through the longitudinal axis of the disk. The disk lays flat upon the capped end. The graphite disk diameter is about the same as the inner diameter of the container. A thin piece of graphite felt is inserted and is placed upon the disk. The graphite felt covers the disk completely. The admixture is uniformly placed in the container on the graphite felt. Another piece of graphite felt and then a disk having longitudinal holes is placed on the admixture and the container subsequently capped with the above-described cap.

The capped container is attached at a through hole of one of the caps to a graphite tube. This assembly is inserted into a SiC furnace tube of a tube furnace. The furnace tube inner diameter is greater than the outer diameter of the container. The container is inserted first. The graphite tube is passed through a water cooled flange having a fitting which seals the graphite tube and also enables the graphite tube to be moved through the flange. The flange is attached to the furnace tube, thus sealing the furnace tube and allowing the container to be moved along the longitudinal axis of the furnace tube. The other end of the furnace tube is sealed by another flange which allows gas to exit the furnace. The graphite tube then is connected to a gas source allowing the flow of gas in a controlled manner through the container (i.e., admixture).

The admixture is reacted by positioning the container in the hot zone of the tube furnace. The furnace is heated to about 1325° C. at a rate of about 20° C./minute. The admixture is reacted for about 10 minutes in a 5 percent hydrogen-95 percent argon gas mixture at this temperature. The gas flow per Kg of admixture is about 40 standard liters/min-Kg. At the end of 10 minutes the furnace is cooled to room temperature. The properties of the monotungsten formed by the method of this example is shown in Table 2.

Examples 5–11

The monotungsten carbide formed by the methods of Examples 5–11 are prepared by the same method described by Example 4 except that for Examples 5–12 the gas flow, reaction time and/or reaction temperature is varied as shown in Table 2.

Example 12

The monotungsten carbide formed by the method of Example 12 is prepared by the same method described by Example 4, except that the heating rate is varied as described below. The admixture is reacted by first withdrawing the graphite tube from the furnace tube to a point where the container is adjacent to the inner surface of the flange (i.e., the container is not in the hot section of the furnace, but is essentially at room temperature when the furnace is hot). The furnace is heated to about 1325° C. The container is inserted into the hot section of the tube furnace in about 2 minutes (i.e., about 650° C./min. heating rate). The admixture is reacted for about 10 minutes in a 5 percent hydrogen-95 percent argon gas mixture. The gas flow per Kg of admixture is about 40 standard liters/min-kg. At the end of the 10 minutes, the container is withdrawn from the hot section in about 2 minutes and the entire furnace allowed to cool. The properties of the monotungsten formed by the method of this example is shown in Table 2.

Examples 13 and 14

The monotungsten carbide formed by the methods of Examples 13 and 14 are prepared by the same method described by Example 12, except that the time of the reaction is varied as shown in Table 2.

Example 15

The monotungsten carbide formed by the method of Example 15 is prepared by the same method described by Example 4, except that a different precursor is reacted with a differing quantity of carbon black at a gas flow of 50 standard L/min-kg.

The precursor mixture is prepared by the entrainment method described herein and in U.S. Pat. No. 5,380,688. The precursor mixture is comprised of WC, $W_2C$, carbon, tungsten oxide and tungsten metal, wherein the precursor mixture has an oxygen concentration of about 0.35 percent by weight, carbon concentration of about 5.16 percent by weight and surface area of about 5.2 $m^2$/g.

The precursor mixture–carbon admixture is made by mixing about 1.4 parts by weight of the carbon black with about 98.6 parts by weight of the above precursor mixture in a urethane lined ball mill partially filled by cemented WC-Co milling media.

The properties of the monotungsten carbide formed by the method of Example 15 are shown in Table 2.

Examples 16 and 17

The monotungsten carbide formed by the methods of Examples 16 and 17 are prepared by the same method described by Example 15 except that the reaction time is varied as shown in Table 2.

TABLE 2

| Example No. | Reaction Temperature (° C.) | Heating Rate (° C./min) | Reaction Time (min) | Gas Flow (Standard L/min-Kg) | Carbon (wt. %) | Oxygen (wt. %) | Surface Area ($m^2$/g) | Equivalent Spherical Diameter (Micrometers) | $W_2C$ Detected by X-ray Diffraction |
|---|---|---|---|---|---|---|---|---|---|
| Example 4 | 1325 | 20 | 10 | 40 | 5.88 | 0.69 | 2.8 | 0.14 | trace |
| Example 5 | 1325 | 20 | 65 | 40 | 5.93 | 0.49 | 2.6 | 0.15 | some |
| Example 6 | 1325 | 20 | 120 | 40 | 5.97 | 0.44 | 2.5 | 0.15 | trace |
| Example 7 | 1325 | 20 | 10 | 330 | 6.12 | 0.15 | 1.4 | 0.27 | none |
| Example 8 | 1325 | 20 | 65 | 330 | 6.10 | 0.13 | 1.2 | 0.32 | none |
| Example 9 | 1325 | 20 | 120 | 330 | 6.12 | 0.14 | 1.2 | 0.32 | none |
| Example 10 | 1150 | 20 | 65 | 40 | 5.98 | 0.65 | 3.2 | 0.12 | trace |
| Example 11 | 1500 | 20 | 65 | 40 | 6.15 | 0.19 | 0.6 | 0.64 | trace |
| Example 12 | 1325 | 650 | 10 | 40 | 5.84 | 0.28 | 2.3 | 0.17 | — |
| Example 13 | 1325 | 650 | 65 | 40 | 5.96 | 0.23 | 2.3 | 0.17 | — |
| Example 14 | 1325 | 650 | 250 | 40 | 6.02 | 0.27 | 2.2 | 0.17 | — |
| Example 15 | 1325 | 20 | 10 | 50 | 6.09 | 0.21 | 2.3 | 0.17 | none |
| Example 16 | 1325 | 20 | 65 | 50 | 6.18 | 0.21 | 2.1 | 0.18 | none |
| Example 17 | 1325 | 20 | 120 | 50 | 6.18 | 0.20 | 2.0 | 0.19 | none |

— Not Determined

Table 2 shows the results of flowing a 5 percent hydrogen-95 percent argon gas mixture through an admixture when forming monotungsten carbide. The first effect is a decrease in surface area with an increase in gas flow. A decrease in surface area is equivalent to an increase in particle size given by equivalent spherical diameters (ESD). ESD, in micrometers, is equal to 6 divided by the density of the material (15.63 g/cc for WC) and divided by the surface area of the powder in $m^2$/g. The effect of increasing the gas flow through the admixture during the reaction is apparent when comparing Examples 4–6 to Examples 7–9. The surface area decreases by a factor of about 2 (e.g., Example 4 vs. Example 7) and subsequently the ESD increases by a factor of about 2.

Gas flow through the admixture also allows greater control of the chemistry of the monotungsten carbide formed. For example, when increasing the flow through the admixture ("high flow," Examples 7–9 vs. "low flow," Examples 4–6) the oxygen in the resultant monotungsten carbide is decreased by a factor of about 3. The carbon is increased to close to a stoichiometric value for WC (6.13 wt. percent) in the "high flow" examples. The monotungsten carbide that is formed also has no detectable $W_2C$ when the gas flow is increased. Even small flow increases can have an effect on the monotungsten carbide formed (Examples 15–17 vs. Examples 4–7). Examples 15–17 are reacted under the same conditions as Examples 4–7, respectively, except that the gas flow is increased from 40 to 50 standard L/minute-kg. Examples 4–7 display higher oxygen concentration, carbon below stoichiometric for WC and the presence of $W_2C$ in the monotungsten carbide, whereas Examples 15–17 have a significantly lower oxygen concentration than Examples 4–7, carbon concentration near WC stoichiometry and no detectable $W_2C$.

The effect of temperature on reacting an admixture with gas flowing through the admixture is shown in Examples 4 and 10–11. The surface area of the resultant monotungsten carbide decreases proportionally with an increase in reaction temperature. For example, the reaction at 1150° C. (Example 10) produces a monotungsten carbide having a surface area of about 3.2 $m^2/g$ and the reaction at 1500° C. produces a monotungsten carbide having a surface area of about 0.6 $m^2/g$. Subsequently, the particle size given by ESD increases proportionally with an increase in reaction temperature.

The effect of a rapid heating rate on the formation of monotungsten carbide is shown by Examples 12–14 compared to Examples 4–6. The rapid heating Examples 12–14 appear to cause a monotungsten carbide with lower oxygen concentration and surface area compared to the slower heated Examples 4–6, respectively. The rapid heating has little effect on the carbon concentration (Example 12 compared to Example 4). Thus, there does not appear to be any significant advantage to rapidly heat the admixture when forming monotungsten carbide according to the invention herein.

What is claimed is:

1. A method to produce a transition metal carbide comprising:
    a) heating a transition metal oxide in the presence of carbon or hydrogen such that the transition metal oxide is partially carburized or at least partially reduced to form a precursor mixture,
    b) forming an admixture by mixing the precursor mixture with a sufficient amount of particulate carbon to carburize the precursor mixture to the transition metal carbide and
    c) heating the admixture in the presence of an inert or reducing gas at a temperature for a time sufficient to convert the admixture to the transition metal carbide, the admixture being heated in the presence of a means to enhance transfer of heat into the admixture wherein the means is a body of graphite or carbon-carbon composite and extends into and contacts at least a portion of the admixture.

2. The method of claim 1 wherein the temperature is from about 900° C. to about 1800° C.

3. The method of claim 2 wherein the temperature is from about 1000° C. to 1600° C.

4. The method of claim 1 wherein the inert or reducing gas is hydrogen, a 2–6 percent hydrogen in argon gas mixture or argon.

5. The method of claim 4 wherein the gas is the 2–6 percent hydrogen in argon gas mixture.

6. The method of claim 1 wherein the transition metal carbide is monotungsten carbide and the precursor mixture is comprised of tungsten, ditungsten carbide, monotungsten carbide, free carbon and at least one form of tungsten oxide.

7. The method of claim 1 wherein the transition metal carbide is monotungsten carbide and the precursor mixture is comprised of tungsten, ditungsten carbide and monotungsten carbide.

8. The method of claim 1 wherein the transition metal carbide is monotungsten carbide and the precursor mixture is comprised of tungsten.

9. The method of claim 8 wherein the time is from about 5 minutes to about 5 hours.

10. The method of claim 9 wherein the time is from about 5 minutes to about 2 hours.

11. The method of claim 1 wherein the body of graphite or carbon-carbon composite is a plate, tube, rod or an array of plates, tubes or rods.

12. The method of claim 1 wherein mixing is performed in a ball mill, V-blender, muller mixer or sigma mixer.

13. The method of claim 12 wherein mixing is performed in a ball mill.

14. The method of claim 1 wherein the transition metal carbide is a carbide of one or more of the transition metals Ti, Zr, Hf, V, Nb, Ta, Cr, Mo, W or carbide compound containing at least two of said transition metals.

15. The method of claim 1 wherein the inert or reducing gas flows through at least a portion of the admixture.

16. The method of claim 15 wherein the inert or reducing gas flowing through at least a portion of the admixture has a flow rate per weight of admixture ranging from about 5 to 500 standard liters/minute-Kg.

17. The method of claim 1 wherein the transition metal carbide is monotungsten carbide and the precursor mixture has an oxygen concentration of less than about 5 percent by weight as determined by combustion analysis.

18. The method of claim 17 wherein the oxygen concentration is less than about 1 percent by weight.

19. The method of claim 14 wherein the transition metal carbide is monotungsten carbide.

20. The method of claim 19 wherein the monotungsten carbide contains, as determined by X-ray diffraction, less than about 5 percent by weight ditungsten carbide and no tungsten metal or tungsten oxide.

21. The method of claim 20 wherein the monotungsten carbide contains less than about 1 percent by weight ditungsten carbide.

22. The method of claim 21 wherein the monotungsten carbide contains no ditungsten carbide.

23. The method of claim 1 wherein the gas is changed from an inert gas to a reducing gas containing hydrogen during the heating of the admixture.

* * * * *